United States Patent [19]

Raney et al.

[11] Patent Number: 4,967,055

[45] Date of Patent: Oct. 30, 1990

[54] PLASMA TORCH

[75] Inventors: Ty A. Raney, Valley Center; Dale R. Bervig, Wichita, both of Kans.

[73] Assignee: Tweco Products

[21] Appl. No.: 332,569

[22] Filed: Mar. 31, 1989

[51] Int. Cl.[5] ............ B23K 9/00

[52] U.S. Cl. ............ 219/121.5; 219/121.51; 219/121.52; 219/121.48; 313/231.51

[58] Field of Search ........... 219/121.49, 121.5, 121.51, 219/121.52, 121.54, 121.57, 121.48, 74, 73; 313/231.21–231.51

[56] References Cited

U.S. PATENT DOCUMENTS

| | | | |
|---|---|---|---|
| 3,450,926 | 6/1969 | Kiernan | 313/231 |
| 3,562,486 | 2/1971 | Hatch | 219/121 |
| 4,311,897 | 1/1982 | Yerushalmy | 219/121 |
| 4,525,094 | 11/1986 | Marhic et al. | 219/121 |
| 4,558,201 | 12/1985 | Hatch | 219/121 |
| 4,581,516 | 4/1986 | Hatch et al. | 219/121.5 |
| 4,590,354 | 5/1975 | Marhic et al. | 219/121 |
| 4,645,899 | 2/1987 | Bebber et al. | 219/121 |
| 4,649,257 | 3/1987 | Yakovlevitch et al. | 219/121 |
| 4,682,005 | 7/1987 | Marhic | 219/121 |
| 4,691,094 | 9/1987 | Hatch et al. | 219/121 |
| 4,701,590 | 10/1987 | Hatch | 219/121.5 |
| 4,716,269 | 12/1987 | Carkhuff | 219/121 |
| 4,743,734 | 5/1988 | Garlanov et al. | 219/121 |
| 4,748,312 | 5/1988 | Hatch et al. | 219/121 |
| 4,769,524 | 9/1988 | Hardwick | 219/121.52 |
| 4,777,342 | 10/1988 | Hafner | 219/121.48 |
| 4,777,343 | 10/1988 | Goodwin | 219/121.5 |
| 4,782,210 | 11/1988 | Nelson et al. | 219/121.52 |

OTHER PUBLICATIONS

Document #1–Author: Thermal Dynamics Corporation, Title: Instruction Manual No. 0–2144, Date: 3/8/88.

Document #2–Author: Thermal Dynamics Corporation, Title: Instruction Manual No. 0–2052, Date: 7/22/88.

Document #3–Author: L-TEC, Title: pp. 2 and 3 of Instructions for Plasma Torch, Date: unknown.

Document #4–Author: Hypertherm, Incorporated: Title: pp. 30 and 31, Torch Assembly Brochure, Date: unknown.

Document #5–Author: Thermal Dynamics, Title: Drawings of Plasma Torch, Date: unknown.

*Primary Examiner*—M. H. Paschall

[57] ABSTRACT

A three-part front-end assembly for a plasma arc cutting torch utilizing a single inlet gas is disclosed. The front-end assembly includes (1) an electrode having an integral, hollow, elongated, interior cooling tube, (2) a tip element with integral swirl ring, and (3) a nozzle. The electrode having an integral, hollow, interior cooling tube stacks upon and nests in the tip element with integral swirl ring. Both of these elements then nest in the nozzle forming the stack configuration of this three part, front end assembly. The invention also includes as a separate element, an electrode having an integral, hollow, elongated, interior cooling tube. Another separate element of this invention is the tip element with integral swirl ring.

19 Claims, 3 Drawing Sheets

PLASMA TORCH

BACKGROUND OF THE INVENTION

1. Field of the Invention

This invention relates to a plasma arc torch utilizing a single inlet gas such as air. The torch is intended to be used for cutting metal.

2. Description of the Prior Art

There are believed to be three major United States manufacturers of plasma arc cutting torches, i.e. Thermal Dynamics Corporation of New Hampshire, L-TEC Company of South Carolina, and Hypertherm, Incorporated of New Hampshire. Each of these domestic manufacturers offer a variety of plasma cutting torches some of which have a three-part front-end assembly and some of which have a four-part front-end assembly; the typical four-part front-end assembly consists of the following four separate elements: a nozzle, a tip, a swirl ring, and an electrode. Nomenclature varies from manufacturer to manufacturer; however, the function of the various components is similar. For example, Thermal Dynamics refers to a nozzle as a shield cup; L-TEC refers to the nozzle as a shield and Hypertherm refers to the nozzle as a cap. The term swirl ring is used by Hypertherm; however, the similar element is referred to by Thermal Dynamics as a gas distributor and by L-TEC as a swirl baffle. The term electrode and tip appear to be generally uniform in the industry.

These domestic manufacturers generally arrange the front-end assembly so that the four components stack and nest with each other. This four-component front-end assembly generally screws to the torch head. Worn components can therefore be easily replaced by operators in the field merely by unscrewing the nozzle and replacing one or more of the worn components.

The electrode used by domestic manufacturers is generally an elongated solid pin. The electrode generally has an insert on one or both ends. The elongate electrode typically stacks and nests inside of the hollow swirl ring. The electrode and swirl ring together stack and nest with a tip which forms a recess to receive the elongate electrode. In conventional plasma torches, the electrode, swirl ring and tip nest inside of the nozzle which is screwed on to the torch head. When this four-part assembly is screwed on to the torch head the electrode is forced into electrical contact with a power source which is well known in the plasma cutting art. This conventional four-part front-end assembly is designed for ease of manufacture, for convenience of replacement in the field, and safety.

Because of the high electrical voltages necessary to operate conventional plasma cutting torches, safety of the operator is always a concern. The stacking and nesting arrangement of the front-end assembly is intentionally designed to further ensure the safety of the operator. For example, if the operator takes the front-end assembly apart with the intention of replacing one or more parts and fails to replace the tip and swirl ring, the electrode will typically drop down by the force of gravity into the nozzle and will not be in electrical contact with the power source. If the electrode does not drop down by gravity it will be forced out of contact with the power supply by the force of the inlet gas passing through the head of the torch when the trigger is actuated. If the operator inadvertently touches the front end of a conventional plasma arc cutting torch which has been mis-assembled without the tip and swirl ring, he will not be shocked because the electrode is not in electrical contact with the power source.

However, if the operator merely omits only the tip and reassembles the electrode, the swirl ring and the nozzle, there is a danger of electrocution if the operator inadvertently touches the front end of the torch. When these three of the four components are mis-assembled, the electrode is still in contact with the power source or is close enough to the power source that electricity will arc across a small gap if the trigger is depressed.

The purpose of the present invention is to minimize the possibility of improper assembly in the field which can expose the operator to injury. The present invention focuses on a three-part front-end assembly including (1) an electrode, (2) a tip element with integral swirl ring, and (3) a nozzle. The electrode itself is also thought to be novel in design as well as the tip element with integral swirl ring. The present invention utilizes a parts-in-place concept sometimes referred to in the industry as PIP. The idea is to design the components so that omission of any element during reassembly in the field will deactivate the torch.

The three-part front end assembly of the present invention is safer than the conventional four-part front-end assembly currently used by the major domestic manufacturers of plasma arc cutting torches. If the operator fails to include the tip element with integral swirl ring of the present invention during re-assembly in the field, the electrode will not be in electrical contact with the power supply if the trigger is depressed. The force of the inlet gas passing through the head of the torch will drive the electrode out of electrical contact with the power supply regardless of the orientation of the torch. Inlet gas conventionally operates in excess of 50 psi. When the trigger is depressed, the controller in the power supply first opens the inlet gas to the torch. This inlet gas will therefore arrive first to the torch and blow the electrode out of electrical contact with the power supply. The present invention utilizing a three-part front-end assembly is therefore clearly superior from the standpoint of safety to the conventional four-part front-end assemblies currently used by the major domestic manufacturers. In addition, the electrode design of the present invention is thought to be unique and superior in function to prior art devices. Likewise, the tip element with integral swirl ring is thought to be unique and superior in function to prior art devices.

U.S. Pat. No. 4,590,354 discloses a three-part front-end assembly including an electrode 2, a nozzle 3, and a skirt 4. This patent claims safety as a primary advantage. When this front-end assembly is disassembled, the patent claims that it is safer than the prior art because the conductive element of the torch body is disposed in a hollow part which is difficult to access from the exterior. The patent does not address the issue of safety in the event an operator mis-assembles the torch in the field. For example, if the operator failed to include the tip, referred to in the patent as a nozzle 3, during re-assembly, the electrode would be in electrical contact with the power source and could cause a serious shock if the operator stuck his finger through the end of the nozzle, referred to in the patent as a skirt, into contact with the electrode.

The present invention focuses on the safety of the operator in the event of improper assembly in the field. The present invention also includes an improved design for the electrode and the tip with integral swirl ring.

U.S. Pat. No. 4,590,354 does not focus on safety during improper assembly in the field; it focuses on safety when the entire front-end assembly is removed from the torch. The teaching of this prior art is substantially different from the teaching of the present invention.

SUMMARY OF THE INVENTION

The present invention is a three-part, front-end assembly for a plasma arc cutting torch utilizing a single inlet gas for both creation of plasma and as a secondary cooling gas. The invention includes three separate and distinct elements: (1) an electrode having an integral, hollow, interior cooling tube, (2) a tip element with integral swirl ring, and (3) a nozzle. The electrode stacks and nests in the tip element with integral swirl ring; the electrode and tip element then stack and nest in the nozzle. The nozzle is then threaded on the torch head for operation. This three-part, front-end assembly is relatively easy to manufacture. In the field, this three-part, front-end assembly facilitates replacement of worn or damaged parts. The unique configuration and arrangement of this three-part, front-end assembly assures a much greater level of safety to the operator in the event of improper assembly in the field. If the operator fails to include the tip element with integral swirl ring when re-assembling the torch, the electrode will be driven by the force of the inlet gas to the base of the nozzle when the trigger is depressed. When the electrode is driven into the nozzle, it loses contact with the electrical power source and therefore is not subject to shocking the operator in the event he inadvertently pulls the trigger and touches the electrode to determine why the torch is not working. In the event of this type of improper assembly, even an amateur operator should notice that the electrode is protruding too far from the torch. This visual indicator is a further safety feature of the present invention.

Of course, no product is foolproof when misuse occurs. If the operator fails to include the tip element with integral swirl ring during re-assembly of the torch, the electrode will not be in electrical contact with the power supply because it has been driven out of contact by the force of the inlet gas; however, if the operator manually pushes the electrode back into contact with the power source and simultaneously actuates the trigger, a severe shock could occur. As previously noted, inlet gas typically operates in excess of 50 psi. There will accordingly be significant forces urging the tip away from contact with the power supply. The operator would therefore have to exert some effort to depress the electrode into electrical contact when the trigger is depressed and the inlet gas is on. This acts as a further safeguard to protect the operator. While not being foolproof, the present invention is substantially safer than the conventional four-part, front-end assembly used by domestic manufacturers and the three-part, front-end assembly disclosed in the aforementioned U.S. patent.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DESCRIPTION OF THE PREFERRED EMBODIMENT

Figure 1:
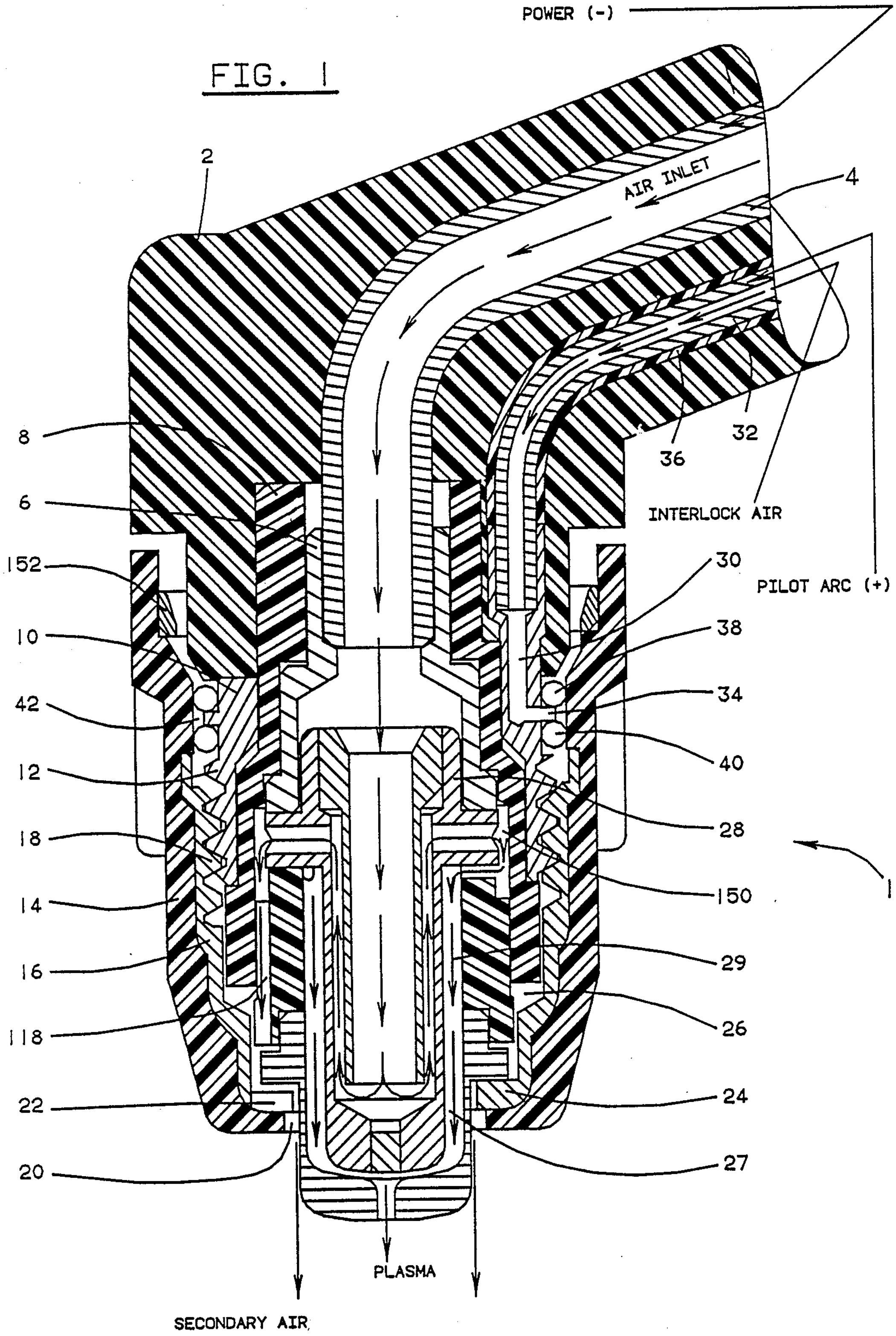
FIG. 1 is a section view of a plasma arc cutting torch head showing the three-part, front-end assembly. The torch shown uses an air interlock system like that utilized in the Hypertherm torch head.

In FIG. 1, the plasma arc torch utilizing a single inlet gas for both creation of plasma and as a secondary cooling gas is generally identified by the numeral 1. The torch head 2 is generally manufactured from plastic or another non-conductive material. An inlet gas tube 4 is centrally positioned in the torch head 2. The inlet gas tube 4 is formed from a copper alloy or any other conductive material. The inlet gas tube connects to a conventional power supply well known to those in the cutting art. The air inlet tube 4 also connects to a conventional source of pressurized air well known to those skilled in the cutting art. Ambient air is used in the preferred embodiment as the inlet gas although other more expensive gases may be used. Ambient air flows from the source of pressurized air through the inlet gas tube 4 as shown by the arrows in the drawing.

The inlet gas tube 4 connects with the electrode seat 6 which is likewise formed of a copper alloy or other conductive material. The electrode seat 6 mounts in a central insulator 8. The central insulator is typically formed of plastic or any other non-conductive material and is firmly molded in the torch head 2. A base ring 10 surrounds the central insulator 8 and is fixedly mounted thereon. The base ring 10 has a plurality of threads 12 formed therein. The base ring 10 is formed from a copper alloy or any other conductive material. A nozzle 14 has an inner basket 16 formed therein as a integral element. The inner basket 16 is formed from brass or any other conductive material. The inner basket 16 has a plurality of threads 18 formed therein and sized to mate and engage with the threads 12 on the base ring 10. The nozzle 14 can therefore be threaded on and off the torch head 2 as the need may arise.

The threaded engagement of the nozzle 14 with the torch head 2 is primarily a matter of manufacturing convenience; however, other means could be devised within the scope of this invention to removably mount the nozzle 14 on the torch head 2. The nozzle 14 has a central aperture 20 formed therein. A plurality of grooves 22 are formed adjacent the central aperture to allow the passage of secondary cooling gas. The bottom of the inner basket 16 forms a circumferential shoulder 24.

Figure 4:
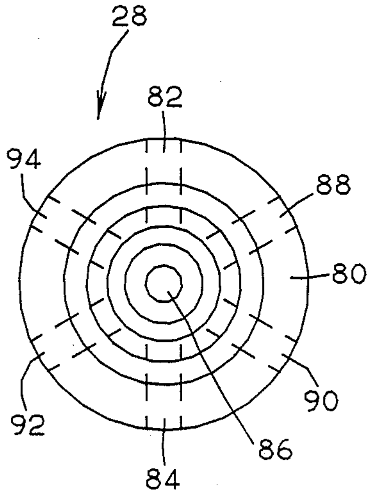
FIG. 4 is a top view of the electrode along line 4—4 of FIG. 3.
Figure 5:
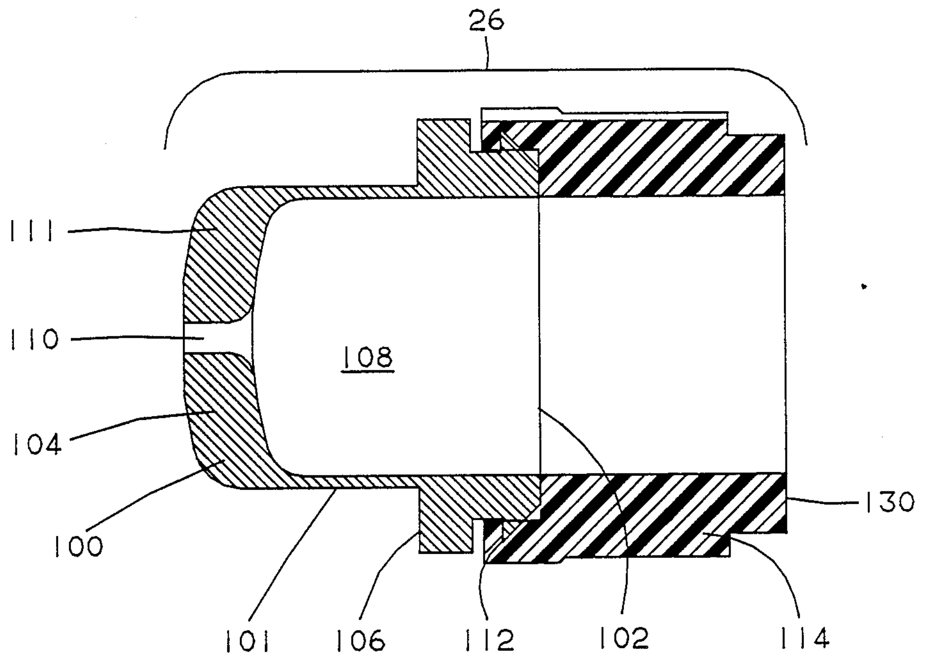
FIG. 5 is a section view of the tip element with integral swirl ring.

The tip element with integral swirl ring is generally identified by the numeral 26, better seen in FIG. 5. The electrode is generally identified by the numeral 28 and will be described in further detail in FIGS. 3 and 4.

The plasma arc torch generally shown in Figure 1 includes an air interlock system generally identified by the numeral 30 which is another safety feature of the torch. This type of air interlock system is well known to those skilled in the welding an cutting arc and is conventionally used in plasma arc torches manufactured by Hypertherm. The plasma arc torch shown in FIG. 1 can also be manufactured with a conventional electrical interlock well known to those skilled in the welding and cutting art such as those used in torches manufactured by L-TEC. These various interlock systems are not a part of this invention, but do serve an important safety feature in the torch. Although well known to those skilled in the art, the air interlock 30 shown in FIG. 1 will be described merely for the sake of completeness.

An interlock air inlet tube 32 enters the torch head 2 and connects with a sensing port 34 in the base ring 10. The interlock air inlet tube 32 is formed from a copper alloy or any other conductive material. An insulator 36 surrounds the interlock air inlet tube 32. A first 0-ring 38 is positioned above the sensing port 34 and a second 0-ring 40 is positioned below the sensing port 34 to define a circular chamber 42 adjacent the port 34. When the nozzle 14 is fully threaded onto the head 2, the chamber 42 is isolated from the atmosphere. When the nozzle 14 is only partially threaded on the head 2 or is completely removed, the chamber 42 communicates with the atmosphere. A source of interlock air is connected to the interlock air inlet tube 32 and is pressurized in the direction of the arrows. When the chamber 42 communicates with atmosphere, the nozzle is either ajar or completely moved from the torch 2. In this case, a sensing device will sense that interlock air is passing from the inlet tube 32 through the port 34 and the chamber 42 to atmosphere and therefore, deactivate the trigger of the torch. The interlock is merely a safety device that prevents power from being applied to the torch head if the nozzle is ajar or has been removed. The interlock air inlet tube 32 is also connected to a pilot arc electrical power supply. The pilot arc is used to start the torch and is well known to those skilled in the plasma arc cutting field. The design and operation of the pilot arc are not a part of this invention nor is the air interlock.

Figure 2:
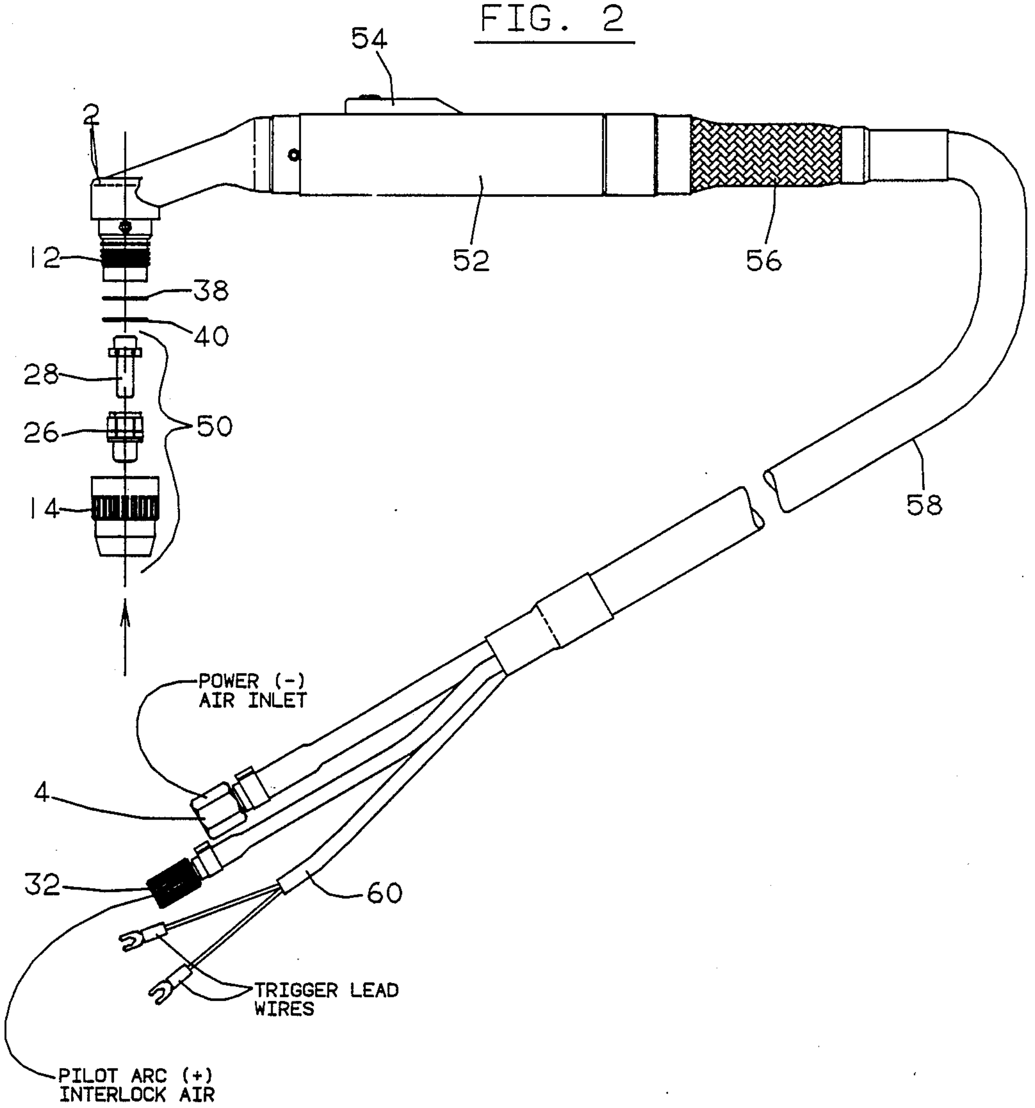
FIG. 2 is an exploded view of the front-end assembly, the torch handle, and the rear end of a plasma arc cutting torch.

In FIG. 2, the front-end assembly is shown in exploded view and is generally identified by the bracket and the numeral 50. The front-end assembly 50 includes the following three elements: the electrode 28, the tip element with integral swirl ring 26, and the nozzle 14.

The first O-ring 38 and the second O-ring 40 are likewise shown in exploded view. The nozzle 14 threadably engages the exposed threads 12 on the torch head 2. The torch head 2 connects with a conventional handle 52. The handle supports a conventional trigger mechanism 54 well known to those skilled in the art. A flexible support 56 extends from the rear of the handle 52. An exterior sheath 58 extends from the flexible support 56 back towards the power supply. The air inlet tube 4, the interlock air inlet tube 32, and a pair of conductors 60 are contained within the sheath 58 and run from the power supply, not shown on the drawing, to the handle 52. The conductors 60 connect with the trigger 54 to control operation of the power supply, as well known to those skilled in the art.

Figure 3:
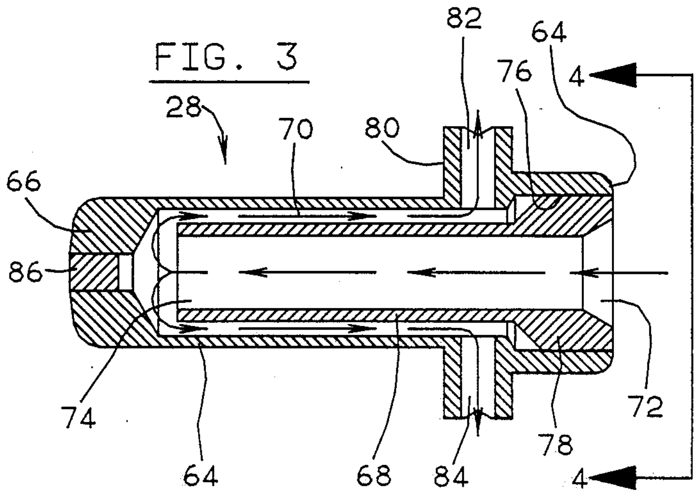
FIG. 3 is a section view of the electrode of the present invention.

In FIG. 3, a cross-section of the electrode 28 is shown. The electrode is an integral part which can be formed from one piece or can be combined from several pieces as a matter of manufacturing convenience, both of which are within the scope of this invention. The embodiment shown in FIG. 3 consists of two elements which are pressed to fit together into an integral piece. An elongated outer tube 62 has a first open end 64 and a second, closed end 66. An internal, hollow, elongated, interior cooling tube 68 is sized to fit inside of the outer tube 62 forming an annular conduit 70. The interior cooling tube 68 has a first open-end 72 and a second open-end 74. The first open end 64 of the elongated outer tube forms an interior circumferential journal 76. The first open end of the integral cooling tube 68 forms an exterior circumferential shoulder 78 sized to seal and engage with the interior journal 76 of the outer tube 62.

A radial shoulder 80 is positioned on the exterior of the outer tube 62 between the first open end 64 and the second closed end 66. A first port 82 is formed in the shoulder 80, said port perforating the exterior wall 62 and allowing communication with the annular passageway 70. A second port 84 is formed in the shoulder 80 and perforates the outer wall 62; likewise, allowing communication with the annular passageway 70. The number of ports 82 and 84 formed in the shoulder 80 is largely a matter of manufacturing convenience; however, as shown in FIG. 4, the preferred embodiment contains six ports.

The electrode 28 has an insert 86 pressed into the second closed end 66 of the outer tube 62. The insert 86 can be formed of hafnium or other highly conductive material. The unique configuration of the electrode 28 is specifically designed to keep the insert 86 as cool as possible as well as to cool the electrode generally. The inlet gas enters the electrode 28 through the first open end 72 of the interior cooling tube 68 as shown by the first arrow in the drawing. The inlet gas then passes through the length of the interior cooling tube 68 as shown by the second and third arrow in the drawing. The interior cooling tube 68 extends substantially the entire length of the outer tube 62 causing the cooling gas to be directed towards the insert 86. The inlet gas then changes directions and passes through the annular passageway 70 and exits the electrode through the ports 82 and 84 as shown by the arrows in the drawing.

This electrode is thought to be a unique design as no prior art designs appear to have an interior cooling tube formed as an integral unit with the electrode. Numerous prior art designs feature an interior cooling tube; however, they are a separate part from the electrode. The more parts the operator has to replace in the field for material purposes, the greater the likelihood of improper re-assembly. The present invention therefore combines the superior cooling features of an interior cooling tube with the added convenience of integral construction. This integral design is also safer than non-integral prior art designs as will be discussed more fully hereinafter.

FIG. 4 is a top view of the electrode 28 taken along line 4—4, of FIG. 3. Ports 82 and 84 are shown in phantom. Additional ports 88, 90, 92, and 94 are also shown in phantom view. The insert 86 can be seen at the bottom of the electrode 28.

In FIG. 5, the tip element with integral swirl ring is generally identified by the bracket and numeral 26. The tip element 100 is a barrel-shaped component forming a first open-end 102 and a second, closed-end 104. The barrel is formed of a copper alloy or other electrically conducted material. A shoulder 106 is formed on the exterior of said barrel 100 between the first open end 102 and the second closed end 104. The first end 102 forms a recess 108 sized to enclose a portion of the electrode 28 when the components are stacked and nested together as shown in FIG. 1. The recess 108 has a larger diameter than the electrode 28 forming the annular passageway 27. An orifice 110 is formed in the blunt terminus 111 of the second closed end 104 of the tip 100. Plasma passes through the orifice 110 to the exterior of the torch. The circumferential barb 112 is positioned on the exterior of the first open end 102 of the tip 100. The barb 112 mechanically engages the swirl ring 114 to create an integral element.

Figure 6:
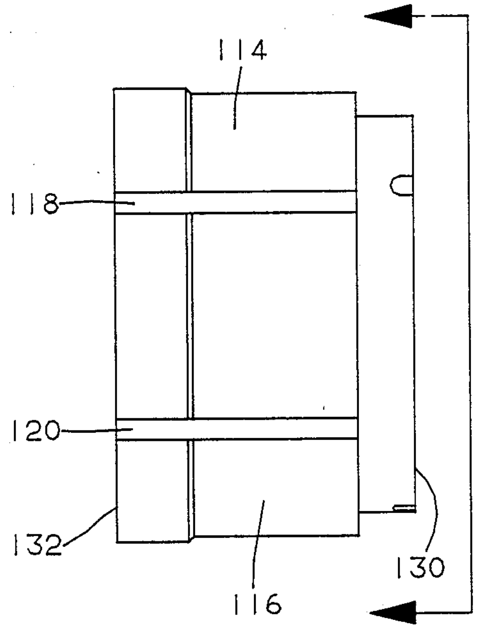
FIG. 6 is a plan view of the exterior of the swirl ring with the tip disconnected.

In FIG. 6, the swirl ring 114 is shown in plan view. The swirl ring 114 is formed from a hollow, generally cylindrical, electrically non-conductive body 116 sized to allow the electrode 28 to pass through the hollow body. The hollow body has a larger diameter than the electrode to create an annular passageway 29 for passage of the inlet gas. The passageway 29, better seen in FIG. 1, and the passageway 27 combine to form a continuous passageway for the passage of gas to the orifice 110 to become plasma.

A plurality of longitudinally aligned channels 118, 120, 122, 124, 126 and 128 are formed on the exterior of said body 116 for passage of the inlet gas. The hollow body 116 has a first flat end 130 and a second recessed end 132. The recessed end 132 receives the barb 112 as best seen in FIG. 5. The first flat end 130 abuts against the shoulder 80 of electrode 28 when stacked and nested in the torch as shown in FIG. 1.

Figure 7:
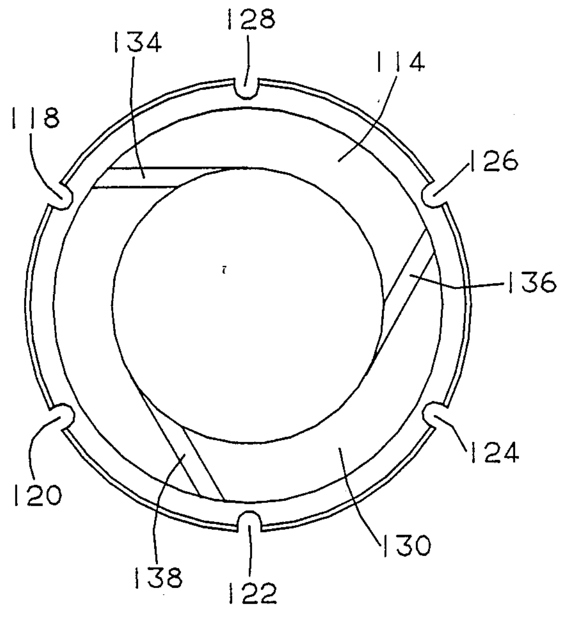
FIG. 7 is a top view of the swirl ring taken along line 7—7 of FIG. 6.

FIG. 7 is a top view of the swirl ring 114 taken along line 7—7 of FIG. 6. A plurality of tangentially aligned slots 134, 136, and 138 are formed in the first flat end 130 of the hollow body 116. Inlet gas passes through slots 134, 136, and 138 causing the gas to swirl in the annular passageway 29 which extends into the annular passageway 27.

The present invention has a unique safety feature which results from a stacking and nesting configuration of the three-part front end assembly 50. As best seen in FIG. 1, the electrode 28 nests inside of the tip and integral swirl ring 26 which nests inside of the nozzle 14. More specifically, the shoulder 80 of the electrode 28 abuts the first end 130 of the swirl ring 114. The outer wall 62 of the electrode 28 then nests inside of the hollow interior of the tip and integral swirl ring 26. The shoulder 106 on the tip 100 abuts the shoulder 24 on the inner basket 16 of the nozzle 14. This nesting arrangement creates a stacked configuration in the front-end assembly which adds an additional measure of safety in the event an operator fails to properly re-assemble the torch in the field. If an operator is replacing one or more worn parts in the field, it is possible to omit one or more parts during re-assembly. For example, assume that the tip and integral swirl ring 26 are omitted by an operator during re-assembly. If this occurred, the electrode 6 would be driven into engagement with the seat 24 of the inner basket 16 of the nozzle 14 by the forces of the inlet gas passing through the torch head. When the electrode is driven to this lower position, there is no longer an electrical contact with the electrode seat 6. If the trigger is depressed, no electrical energy will be transmitted to or arc across to the electrode. If the operator touches the electrode, there is little risk of injury so long as the operator does not push the electrode back into contact with the electrode seat. It is somewhat difficult to push the electrode backs into contact with the electrode seat because of the forces being exerted against the electrode by the inlet gas when the trigger is actuated. This unique stacking and nesting arrangement of the front-end assembly 50 provides a significant measure of protection over the prior art. In the conventional prior art designs, the four-part front-end assembly can be improperly assembled in such a way that the electrode remains hot and can result in electrocution or severe injury to a worker who may touch the tip in an effort to find out why the apparatus is malfunctioning.

Another advantage of the present invention relates to a second mode of mis-assembly in the field. Assume that a conventional three-part torch is mis-assembled without the electrode or tip; some of these conventional torches have a non-integral cooling tube which screws into or is permanently attached to the torch head and would be near to or protrude beyond the nozzle. In this circumstance, the conventional non-integral cooling tube would be hot when the trigger is actuated and could result in shock to the operator. In the present invention, if the electrode and integral cooling tube were omitted during re-assembly together with the tip and integral swirl ring, there would be nothing protruding from the nozzle to shock the operator.

OPERATION OF THE PREFERRED EMBODIMENT

This plasma arc torch utilizes a single inlet gas for creation of both plasma and for use as a secondary cooling gas. The single inlet gas is typically ambient air and enters the apparatus through inlet gas tube 4. The inlet gas passes from the power supply through the inlet tube 4 and into the head 2 as shown by the arrows in FIG. 1. The inlet gas then enters the electrode 28 through the first open end 72 and passes through the hollow interior cooling tube 68 as shown by the arrows in FIG. 1. The inlet gas then contacts and cools the insert 86 at the bottom of the electrode 28 and reverses directions passing through the annular conduit 70 to the ports 82, 84, 88, 90, 92 and 94. The inlet gas then encounters a circumferential chamber 150 formed between the central insulator 8, the electrode 28 and the swirl ring 114. When the gas enters the circumferential chamber 150, it is directed into a first stream and a second stream. The first stream is ultimately used for the creation of plasma; the second stream is used as a secondary cooling gas.

As shown by the arrows in FIG. 1, the first stream passes from the chamber 150 through the tangentially aligned slots 134, 136, and 138 through annular passageway 29 and 27 to the area between the electrode 28 and the tip 100. As this gas passes between the electrode 28 and the tip 100, an electrical arc ionizes the gas into plasma as it exits the orifice 110 through the tip 100 as shown by the arrow in FIG. 1.

The second stream of gas which is used for the secondary cooling gas passes from the chamber 150 through the longitudinally aligned channels 118, 120, 122, 124, 126, 128 in the swirl ring 114 as shoWn by the arrow in FIG. 1. This gas then passes through a plurality of grooves 22 and impacts the tip 100 at a thin wall 101. The wall 101 is intentionally thin to promote heat exchange between the secondary cooling gas and the tip 100. The secondary cooling gas then exits the central aperture 20 of the nozzle 14 as shown by the arrows in FIG. 1.

Those skilled in the art of welding and cutting are familiar with the electrical operation of a plasma arc torch; however, for the sake of completeness, the electrical operation will be briefly described. The plasma arc torch 1 operates on a transferred arc principal. Negative DC power is generated by a conventional power source and is conducted along the air inlet tube 4 to the torch head 2. The electricity then passes to the electrode seat and thereafter to the electrode itself. The electrode is properly referred to as a cathode and the workpiece as an anode. The electricity arcs from the electrode to the workpiece across an ionized gas stream which is referred to as plasma. In order for this arc to be maintained, the torch tip must touch the workpiece or be approximately within $\frac{1}{8}$- to 3/16-inch from the workpiece. This is referred to in the industry as a transferred arc. If the torch is moved away from the workpiece, the transferred arc ceases because it is not powerful enough to jump across such a great distance.

In order to start the torch, a pilot arc feature is provided and is well known to those skilled in the art. The pilot arc is initiated when the torch is some distance away from the workpiece. The operator depresses the trigger which creates a pilot arc from the electrode which serves as a cathode to the tip which serves as an anode. An electrical circuit is formed between the tip, the inner basket, the central mounting ring, the air interlock tube, and the power supply. When the trigger is initially pulled, an initial high voltage creates an arc between the electrode and the tip which is referred to in the industry as the pilot arc. When the tip touches to within approximately $\frac{1}{8}$-inch of the workpiece, a cutting arc drops from the electrode to the workpiece through the plasma stream. Once the cutting arc is established, the sensor in the power supply automatically cuts off the pilot arc as long as the trigger is depressed. If the torch is moved approximately $\frac{1}{8}$-inch or more away from the workpiece, the cutting arc will stop and the pilot arc will automatically resume due to appropriate sensors and control mechanisms in the power supply. The sensors and control mechanisms are well known to those skilled in the art and are not the subject of this invention.

As will be appreciated by those skilled in the art, the present invention can also be used with a torch which uses an electrical interlock instead of the air interlock disclosed in FIG. 1. An electrically conductive ring 152 is mounted in the nozzle 14 for interaction with an electrical interlock like those used by L-TEC.

While the foregoing is directed to the preferred embodiment of the present invention, other and further embodiments of the invention may be devised without departing from the basic scope thereof, and the scope thereof is determined by the claims which follow.

What is claimed is:

1. A front-end assembly for a plasma arc torch utilizing a single inlet gas for both plasma and secondary gas, comprising:

a. subassembly including a tip element with integral swirl ring said subassembly being removable from said plasma arc torch;
b. an electrode having an integral hollow elongated interior cooling tube, said electrode nesting in said subassembly;
c. a nozzle, said subassembly nesting in said nozzle; and
d. means for releasably mounting said nozzle on said torch, said subassembly nesting in said nozzle, and said electrode nesting in said subassembly when said nozzle is mounted on said torch.

2. The apparatus of claim 1 wherein said electrode includes:

a. an elongated outer tube having a first open end and a second closed end;
b. said integral hollow elongated interior cooling tube sized to fit inside of said outer tube forming an annular conduit between said interior cooling tube and said outer tube, said interior cooling tube having a first end and a second end, said first end of said interior cooling tube engaging and sealing with said first open end of said outer tube; and
c. a radial shoulder positioned on the exterior of said outer tube, said shoulder having at least one port therein perforating said outer tube and allowing said inlet gas to pass from said annular conduit through said port to the exterior of said electrode.

3. The apparatus of claim 2 wherein said subassembly including said tip element with swirl ring includes:

a. a hollow generally cylindrical electrically non-conductive body sized to allow said electrode to pass through said hollow body, said hollow body having a larger diameter than said electrode to create an annular passageway for passage of said inlet gas;
b. a plurality of longitudinally aligned channels in the exterior of said body for passage of said inlet gas;
c. said hollow body having a first end and a second end; and
d. said first end abutting said shoulder of said electrode and said first end forming a plurality of tangentially aligned slots causing said gas to swirl in said annular passageway, after it passes through said slots.

4. The apparatus of claim 3 wherein said tip element further includes:

a. an electrically conductive barrel forming a first open end and a second closed end having a blunt terminus;
b. a shoulder on said barrel positioned between said first end and said second end;
c. said first end forming a recess sized to enclose a portion of said electrode, said recess having a larger diameter than said electrode to extend said annular passageway for said inlet gas;
d. an orifice in said blunt terminus allowing said inlet gas to pass from said annular passageway through said orifice as plasma to the exterior of said tip element; and
e. a barb positioned on said first open end of said barrel for engaging said swirl ring to create an integral element.

5. The apparatus of claim 4 wherein said nozzle includes:

a. a central aperture sized to permit said tip to pass through said aperture and extend beyond said nozzle; and
b. a plurality of grooves adjacent said central aperture allowing said secondary gas to contact said tip for cooling of said tip and allowing said secondary gas to exit said torch in an envelope about said plasma.

6. The apparatus of claim 5 wherein said electrode has an electrically conductive insert positioned in said second closed end of said electrode.

7. The apparatus of claim 6 wherein said electrode is formed from an electrically conductive material.

8. The apparatus of claim 7 wherein said electrically conductive material is a copper alloy and said insert hafnium.

9. The apparatus of claim 5 wherein said nozzle further includes an inner basket of electrically conductive material in electrical contact with the electrical supply of the pilot arc to initially start the arc in said torch.

10. The apparatus of claim 9 wherein said means for releasably mounting said nozzle is a series of threads in said inner basket sized to mate and engage with a series of threads as on the surface on said torch.

11. The apparatus of claim 9 wherein said swirl ring is plastic and said tip is a copper alloy.

12. The apparatus of claim 2 wherein said cooling tube extends substantially the entire length of said integral electrode inside of said outer tube for cooling of said insert.

13. A removably elongated electrode for use in a plasma arc torch, said torch further including an electrically conductive seat, a trigger assembly, a compressed air source, a subassembly including a tip element with integral swirl ring and a nozzle comprising:

a. a elongated outer tube having a first open end and a second closed end;

b. an integral hollow elongated interior cooling tube sized to fit inside of said outer tube forming an annular conduit between said interior cooling tube and said outer tube, said interior cooling tube having a first end and a second end, said first end of said interior cooling tube engaging and sealing with said first open end of said outer tube;

c. a radial shoulder positioned on the exterior of said outer tube, said shoulder having at least one port therein perforating said outer tube, said port in communication with said annular conduit; and d. said radial shoulder engaging an electrically conductive seat when said electrode is assembled with said subassembly and said nozzle; and e. said radial shoulder being blown out of engagement with said conductive seat by said compressed air source when said trigger is engaged and said electrode is assembled with said nozzle.

14. The apparatus of claim 13 wherein said integral electrode includes:

a. said first open end of said elongated outer tube forming an interior circumferential journal.

b. said first end of said integral cooling tube forming an exterior circumferential shoulder sized to seal and engage with said interior journal.

15. The apparatus of claim 14 wherein said cooling tube extends substantially the entire length of said integral electrode inside of said outer tube for cooling said insert.

16. The apparatus of claim 15 wherein said electrode has an electrically conductive insert positioned in said second closed end of said electrode.

17. The apparatus of claim 16 wherein said electrode is a copper alloy and said insert is hafnium.

18. A removable subassembly including a tip element with integral swirl ring for use in a plasma arc torch employing an elongate electrode, and an inlet gas, said integral swirl ring including:

a. a hollow generally cylindrical electrically nonconductive body sized to allow said electrode to pass through said hollow body, said hollow body having a larger diameter than said electrode to create an annular passageway for passage of said inlet gas;

b. a plurality of longitudinally aligned channels in the exterior of said body for passage of said inlet gas;

c. said hollow body having a first end and a second end; and d. said first end abutting said shoulder of said electrode and said first end forming a plurality of tangentially aligned slots causing said gas to swirl in said annular passageway, after it passes through said slots.

19. The apparatus of claim 17 wherein said tip element further includes:

a. an electrically conductive barrel forming a first open end and a second closed end having a blunt terminus;

b. a shoulder on said barrel positioned between said first end and said second end;

c. said first end forming a recess sized to enclose a portion of said electrode, said recess having a larger diameter than said electrode to extend said annular passageway for said inlet gas;

d. an orifice in said blunt terminus allowing said inlet gas to pass from said annular passageway through said orifice as plasma to the exterior of said tip element; and e. a barb positioned on said first open end of said barrel for engaging said swirl ring to create an integral element.

* * * * *